Feb. 19, 1935. H. J. COYNE ET AL 1,991,379
METHOD AND APPARATUS FOR FILLING UPHOLSTERY PLAITS
Filed Aug. 14, 1930 5 Sheets-Sheet 4
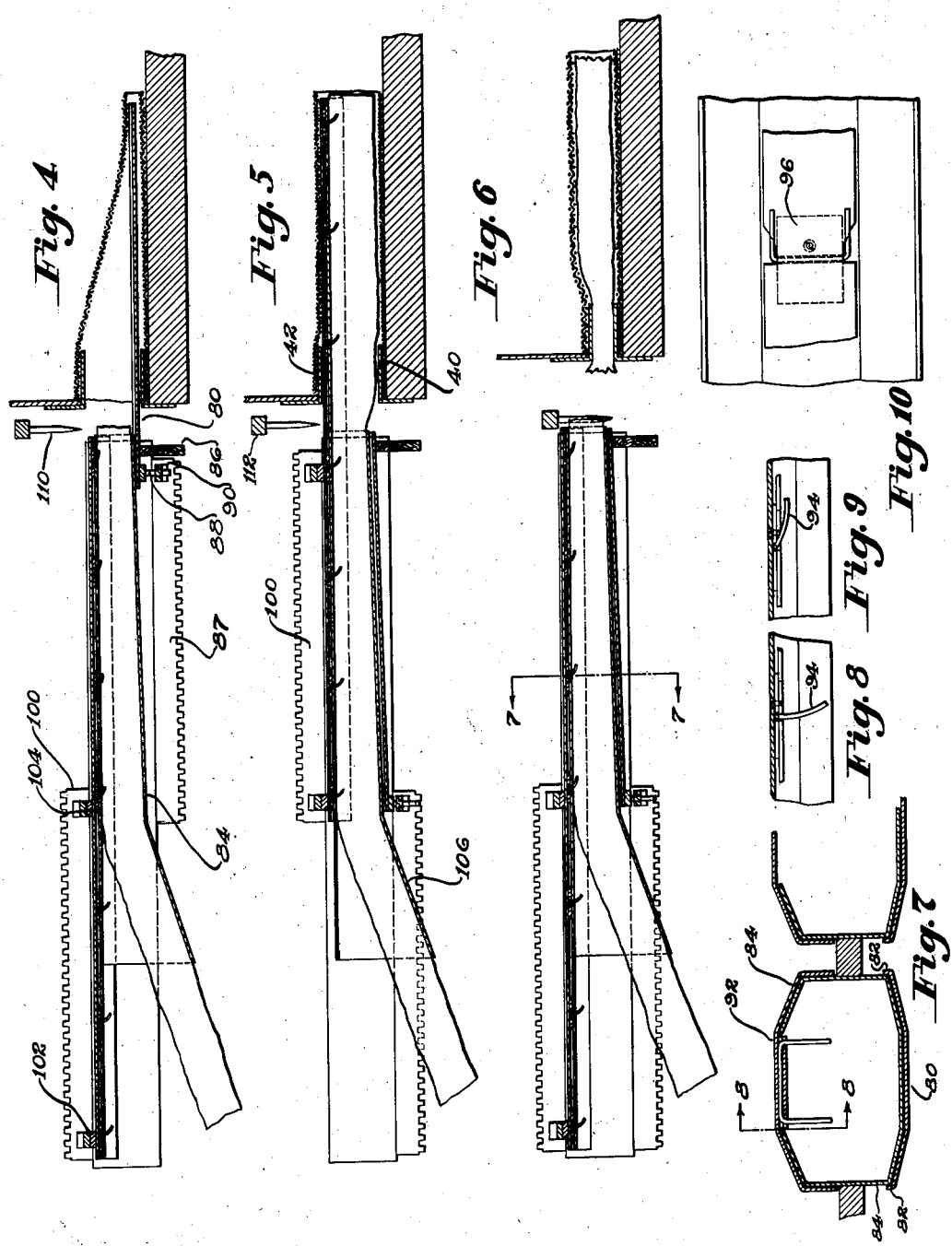

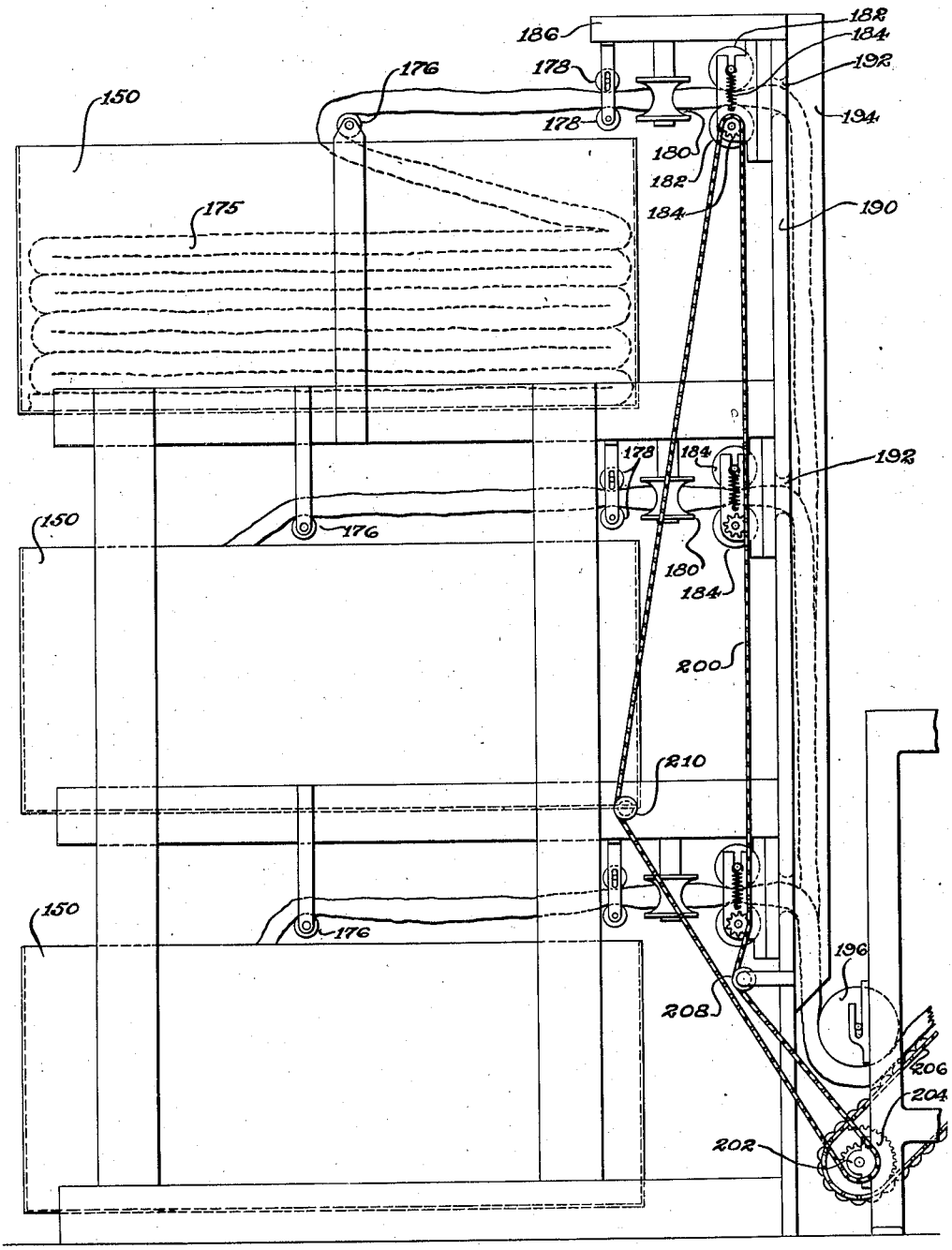

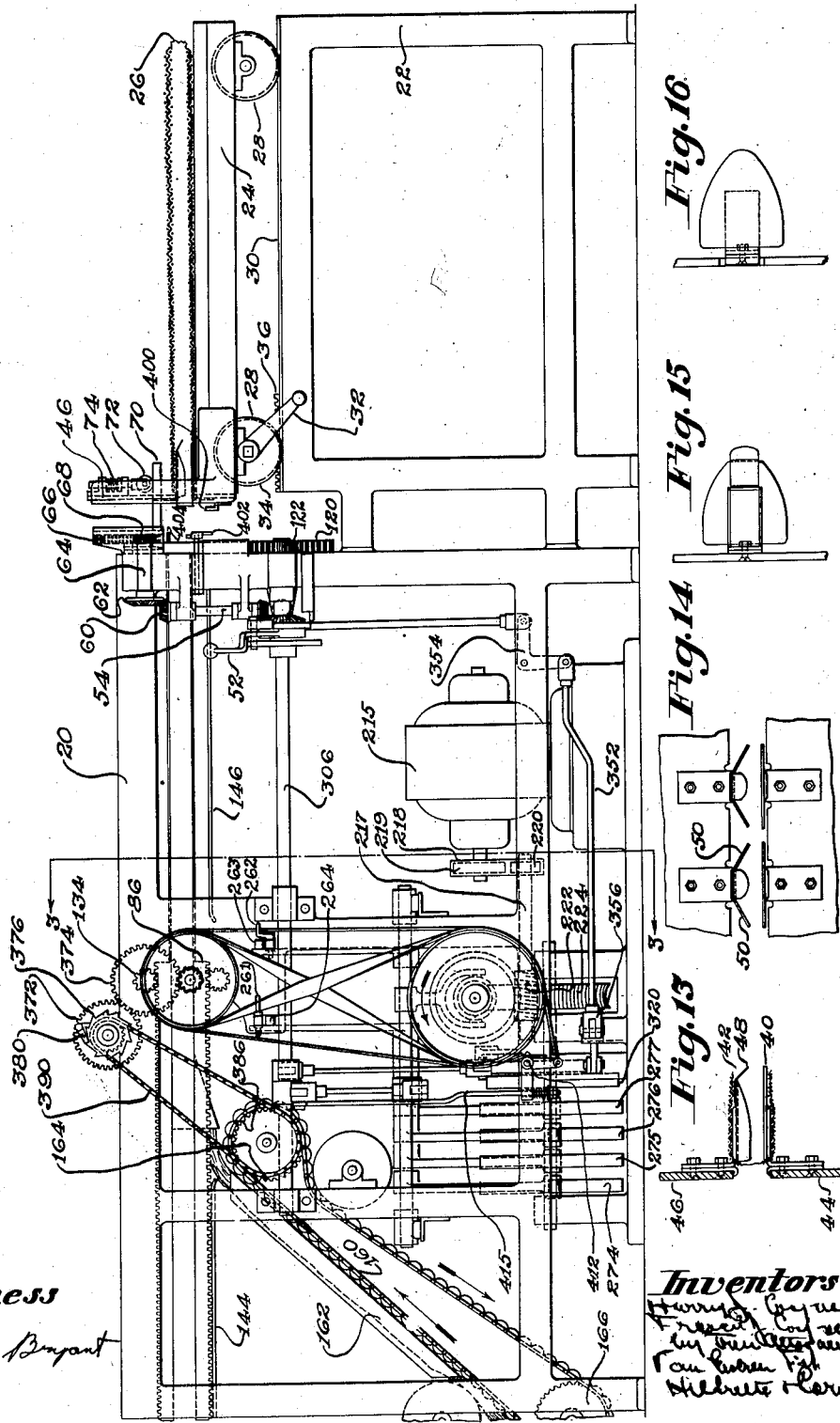

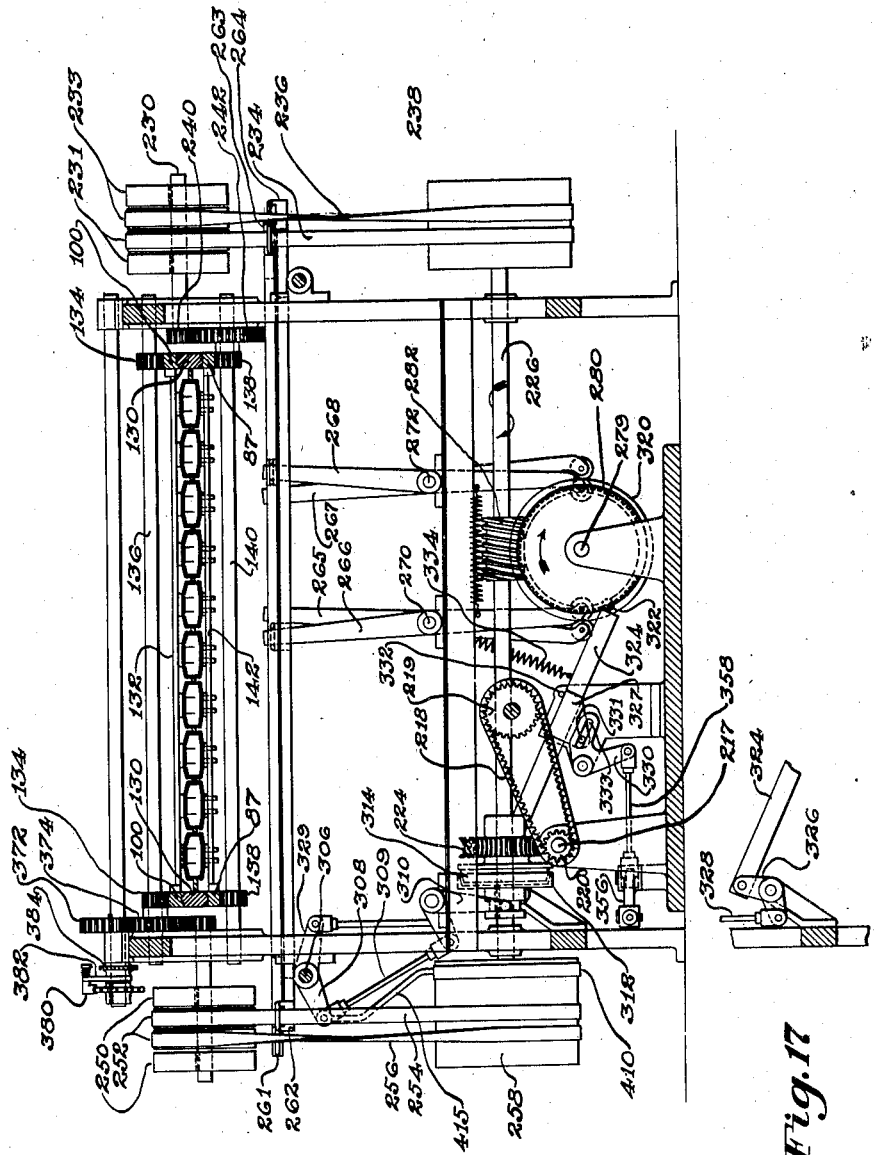

Feb. 19, 1935.  H. J. COYNE ET AL  1,991,379
METHOD AND APPARATUS FOR FILLING UPHOLSTERY PLAITS
Filed Aug. 14, 1930  5 Sheets-Sheet 5
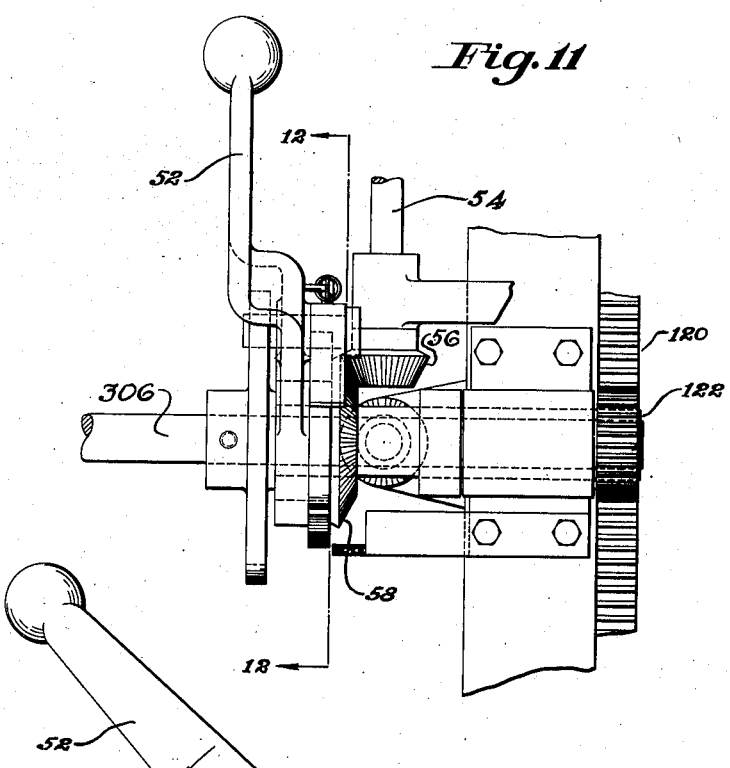
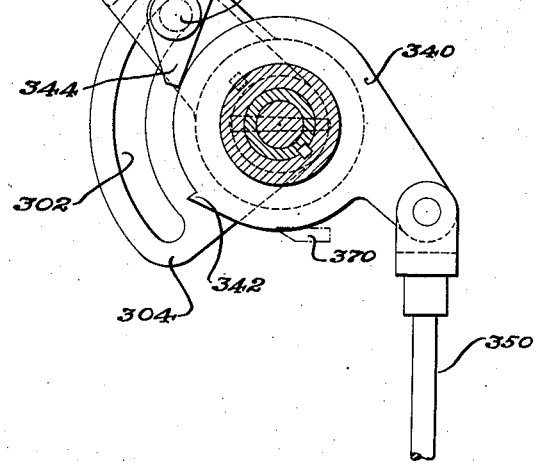

Patented Feb. 19, 1935

1,991,379

UNITED STATES PATENT OFFICE 1,991,379

METHOD AND APPARATUS FOR FILLING UPHOLSTERY PLAITS

Harry J. Coyne, Weston, and Francis J. Coyne, Newton Center, Mass., assignors to Sterling Fibre Company, Waltham, Mass., a corporation of Massachusetts Application August 14, 1930, Serial No. 475,330

12 Claims. (Cl. 226—43)

The present invention relates to a method and apparatus for filling or stuffing upholstery plaits with a suitable padding, and is more particularly adapted for the stuffing of plaited upholstery such as is employed in motor vehicle bodies, car seats, and upholstered furniture.

The principal object of the invention is to simultaneously stuff a plurality of formed plaits at one and the same time in a manner to promote uniformity of filling and economy of time.

A further object of the invention is to provide a new, a novel and more effective method of stuffing upholstery plaits independently of whether or not the method is applied to the stuffing of one or more plaits at the same time.

With these and other objects in view, a feature of the invention contemplates the maintenance of the plait in position for the insertion of the filling or stuffing bat, accompanied by the preliminary insertion of a paddle to provide a supporting and guiding surface extending throughout the length of the empty compartment. The insertion of this paddle is followed by the insertion of the bat through the medium of a second paddle or insertion member. Thereafter the first paddle is withdrawn, followed by the withdrawal of the insertion member, the friction of the compartment on the inserted pad retaining the latter against withdrawal with the paddles without the necessity of pressure or clamping of the end of the bat.

Although the bat may be inserted as a member cut to predetermined length or as the end portion of a bat of substantially greater length than necessary for insertion and thereafter severed, we prefer to insert the bat as the end portion of the bat of substantial length, and subsequently after insertion and withdrawal of both paddle members to sever the bat approximately at the point of insertion. This we accomplish in a simple and effective manner by holding the main portion of the bat with needles and pulling the inserted portion in a lengthwise direction through a movement of the plaited upholstery with the inserted filling therein.

In addition to the new and novel method of uniformly and adequately filling individual compartments, we propose to simultaneously fill a number of compartments at the same time, this number conceivably approximating the number of compartments included in a given seat back or article of furniture, and have for this purpose designed apparatus which simultaneously operates a plurality of cooperating paddles in proper timed relation to one another. In conjunction with these paddles and their operating mechanism we have provided means for properly and adequately feeding individual lengths of bat in position to be engaged by the paddles, the number of these individual bat lengths corresponding to the number of compartments to be filled.

Still further features of the invention consist of certain novel features of construction, combinations and arrangements of parts hereinafter described and claimed, the advantages of which will be obvious to those skilled in the art from the following description.

In the accompanying drawings illustrating the preferred form of the invention Figures 1 and 2, taken in combination, illustrate a side elevation of an apparatus designed to feed a series of lengths of bat in the operating paddles and to advance the end portions of such bat lengths into the open compartments of the plaited upholstery; Figure 3 is a section of that portion of the apparatus shown in Figure 2 taken upon the line 3—3 of Figure 2; Figures 4 to 6 inclusive are partial diagrammatic views in section illustrating respectively the lower paddle in advanced position with the upper paddle in position to insert the end of the bat in the compartment, the upper paddle with accompanying bat after insertion in the compartment, and withdrawal of the lower paddle to initial position, and the pad within the compartment after withdrawal of the upper paddle and severing of the end portion; Figure 7 is a detail illustrating a section on the line 7—7 of Figure 6, and showing the paddles with the cooperating stationary guide tube; Figures 8 and 9 are detail sections upon the line 8—8 of Figure 7 illustrating the bat engaging members respectively in operative and inoperative position; Figure 10 is a detail illustrating an inverted plan view of one of the bat engaging hooks; Figures 11 and 12 are details illustrating the manually operated control mechanism, Figure 12 being a section upon the line 12—12 of Figure 11; Figure 13 is a detail illustrating the cooperating members for distending the mouths of the empty compartments; Figure 14 is a right elevation of two sets of compartment opening members as shown in Figure 13; Figures 15 and 16 are further details illustrating the construction of the compartment distending members; and Figure 17 is a detail illustrating a portion of the clutch operating mechanism illustrated in Figure 3.

The machine shown illustrating the embodiment of the invention and by virtue of which our new process is carried out comprises essentially a frame 20 within which the sets of cooperating paddles are mounted for reciprocatory movement. This frame also contains mechanism for actuating the paddles in timed relation to one another. Connected to the front portion of the main frame 20 is a second and lower frame or bed 22 upon which is mounted for movement lengthwise of the movement of the paddles a carriage 24 which is adapted to support the plaited upholstery as may be indicated generally at 26. The carriage is provided with wheels 28 running on tracks 30 to maintain it in register with the paddles and provided with a hand operated crank 32 which traverses the carriage lengthwise through engagement of a pinion 34 with a stationary rack 36. The purpose of moving the carriage is to move the plaited upholstery in a direction lengthwise of the bats to sever the inserted ends of the bats at the completion of the filling operation. In actual practice, the plaited upholstery is spread out in flattened form on the upper surface of the carriage 24 with the mouths of the empty compartments in substantial register with the sets of cooperating openers 40 and 42, as indicated more particularly in Figures 4 to 6. The lower surface of the fabric is inserted beneath the projecting stationary members 40 which are in the form of relatively thin shoes or plates rigidly connected at spaced intervals to the transverse bar 44 mounted on the end of the carriage. The upper portion of the plaited upholstery is drawn over the cooperating or movable shoes 42 which are mounted in similarly spaced relation on a movable bar 46. The upper shoes, as indicated particularly in Figures 13 and 14 are made of thin metal and are provided with a downwardly extending tip portion 48 and downwardly inclined wing portions 50 aiding the application of the fabric thereto and to promote a rounded opening or mouth when the two shoes are separated. With the mouths of the compartments thus drawn over the cooperating shoes 40 and 42, separation of the latter serves to distend the mouths sufficiently to permit insertion of the bat and accompanying insertion members. This is conveniently accomplished from the centralized manual control 52 which, upon the pressure of the handle, turns a vertical shaft 54 through intermeshing bevel gears 56 and 58. The rotation of this shaft through a second set of bevels 60 and 62 serves to rotate a shaft 64 and lift a rack 66 through a pinion 68. The rack 66 has connected therewith an operating bar 70 which is connected with the movable head 46 through a guide roll 72 and a spring 74. The provision of the bar and the cooperating guide roll permits elevation and depression of the shoes 42 in different positions of separation of the carriage 24 and the provision of the spring 74 permits continued movement of the elevating bar 70 without corresponding movement of the upper shoes 42 with attendant breakage of fabric in the event that the mouths of the compartments are distended to their limit of capacity before the manual control 52 has been depressed to its full extent. This separation of the shoes not only distends the mouths of the compartments but, in addition, clamps the fabric thereto in such a fashion as to prevent displacement of the fabric upon insertion of the filling or stuffing bats.

Having distended the mouths of the empty compartments, clamped the fabric thereto as previously described, the plaited upholstery is ready for insertion of one or more bats of proper dimensions. This is conveniently accomplished through the employment of separate upper bat introducing and lower bat supporting paddles operating successively and intermittently to secure the proper insertion of the bat in a manner to uniformly and adequately fill the compartment throughout its length without wadding or unusual or uneven compression of the bat at any localized point. In the accomplishment of this purpose, a series of lower paddles or guides 80 are employed, as shown more particularly in Figures 4 to 6, there being one paddle for each compartment to be filled. These lower paddles 80 are slightly dished or concaved, approximately as indicated in Figure 7, and are provided with slight flanges or lips 82 to promote guidance by the stationary tube 84. Each of the paddles is attached adjacent its rear end to a movable rack 86 guided in suitable ways in the frame of the apparatus. During its advancing and retracting movements, the free portion of the paddle is guided between the tube 84 and the upper edge of the transverse support 86, as shown in Figure 4. The rear end of the paddle is loosely connected to the rack through a pin 88 sliding in a lug 90 to permit relatively free up and down movement of the paddle with respect to the rack. The paddle approximates the length of the pocket to be filled and, when completely advanced, assumes approximately the position shown in Figure 4, in this position serving as a support or guide over which the entering bat is enabled to slide smoothly. Operating in conjunction with both the upper and lower paddles are a series of stationary guide tubes, previously indicated as 84, these tubes being rigidly mounted in spaced relation and in alignment with the entering movement of the bats. Each of the tubes is of general rectangular dimension cross section approximating the general dimensions of the compartment to be filled. These tubes serve to confine the bat in its advancing movement to a point just short of the mouths of the pockets and aid in the free advance of the bats by the upper paddles. Cooperating with the lower paddles or support are a series of inserting members or upper paddles 92 which are generally concave or dished in transverse section and are slidingly supported on the upper portions of the guide tubes 84. These upper paddles are constrained from movement except lengthwise of the guide tubes, and each of these paddles is provided with a series of loosely depending bat gripping fingers 94 which consist respectively of U-shaped wires pivoted in brackets 96 and prevented by shoulders upon the brackets from moving beyond the position shown in Fig. 8 during the advancing movement of the paddles, but freely moving into the position shown in Fig. 9 upon the movement of retraction of the paddles. With this construction it will be evident that as each of the upper paddles is advanced, the end portion of the bat is caused to advance therewith through uniform engagement by the pivoted gripping members 94. The advancing movement of the upper paddles in timed relation to that of the lower paddles is accomplished by a series of racks 100 to which the paddles are connected at spaced points by lugs 102 and 104. The paddles are guided in their movements by the racks and the surface of the guide tube located therebeneath. With respect to Figures 4 to 7 inclusive, it will be evident that the guide tube is provided with a longitudinal slot in the upper surface which permits projection therethrough of the bat engaging members in order that the bat, although constrained laterally by the guide tube, shall be moved lengthwise therein by the fingers mounted upon the moving paddle. When the upper paddle has been completely advanced by the racks 100, it assumes approximately the position shown in Figure 5. With the bat in this position, the lower paddle is withdrawn or retracted to the position shown in Figure 5, the bat being held against such withdrawal by the fingers 94. The withdrawal of the lower paddle leaves the bat surrounded at its bottom and sides by the fabric of the compartments, and the resistance to withdrawal exerted by the walls of the compartments serves to maintain the bat against withdrawal upon the retraction of the upper paddles, the clamping fingers during such retraction swinging upwardly to approximately the position shown in Figure 9, and sliding freely over the bat without tendency to withdraw the bat therewith. As will be evident from an inspection of Figures 4 to 6, the entering ends of the guide tubes 84 are provided with a downwardly flaring wall 106 over which the bat is drawn. The position of this wall promotes and facilitates insertion of the bat therein. It will be evident to those skilled in the art that as the length of bat is inserted within the pocket, a sufficient amount of bat for the next succeeding insertion is drawn into the guide tube ready for engagement by the upper paddle upon the next succeeding advancing movement. After the bat has been completely inserted, as illustrated in Figure 5, and the upper paddle retracted to initial position, as shown in Figure 6, the control handle 52 is actuated to depress the upper distending shoes 42. To clamp the rear end of the bat at the same time a series of holding needles 110 carried upon a bar 112 are moved downwardly into operative engagement with the main portion of the bat, as shown in Figure 6, when thereafter the carriage is separated from the main frame by manual operation through the handle 52, the bat is severed approximately at the mouths of the pockets, as shown clearly in Figure 6. The operation of the holding needles through the control 52 is conveniently accomplished through a rack 120 and pinion 122. The rack 120 is connected to the needle carrying bar and as the pinion is rotated through the operation of the control, the bar is depressed, bringing the needles into contact with the bats therebeneath. At the same time, the shoes 42 are depressed to clamp the rear ends of the bats inserted in the pockets. In actual practice it is desired to operate the needles more rapidly than the shoes, and to this end the rack and pinion are designed to depress the needles and bring them in operating position, more rapidly with the movement of the shoes into the position shown in Figure 6.

As indicated more particularly in Figures 2 and 3, the upper racks 100 for operating the upper paddles are disposed on opposite sides of the apparatus and are guided by the upper portions of stationary guide bars 130. These racks are connected to individual paddle members by transverse bars 132 to cause all of the paddles to operate in timed relation to the racks. The racks are operated in timed relation through oppositely disposed pinions 134 mounted upon the shaft 136. The lower racks 87 are similarly guided by the under side of the guides 130 and are operated through pinions 138 mounted upon a shaft 140. The lower paddles are connected to these racks through a transverse bar 142. In addition, the lower racks are maintained in contact with the guide members by under guides 144 and 146, as shown in Figure 2, separated to permit insertion of the bat in operation with the racks.

The individual lengths of bat are directed to the guide tubes from holding compartments indicated generally at 150. These holding compartments may be nothing more than containers in which the length of bat is coiled, these containers being suitably designed for detachable mounting in the frame of the machine. As indicated in Figure 1 of the drawings, three of these containers 150 are superimposed above one another with a sufficient duplication of superimposed containers to give the desired number of lengths of bat. From each individual container, the lengths of bat are delivered to a wide conveyor belt indicated at 160 in Figure 2, the conveyor belt carrying the bats upwardly and discharging them in the region of the flared mouths or entrances 106 of the cooperating guide tubes. Associated with the conveyor belt are shields or guide tubes 162 for maintaining the individual bats in contact therewith. The conveyor belt is mounted at opposite ends upon sprocket members 164 and 166 and is intermittently operated in timed relation to the paddles in a manner to be presently described. The lengths of bat contained in the compartments 150 are delivered in proximity to the lower end of the conveyor belt with each length of bat in alignment with its respective guide tube. This guiding arrangement for the bat lengths differs, depending upon the container from which the bat is drawn. As shown more particularly in Figure 1, the coil of bat indicated at 175 as contained in the upper container 150 passes outwardly therefrom over a guide pulley 176, mounted above the container, and thence between cooperating pairs of guide pulleys 178 and 180, disposed at right angles in order to guide the bat and preserve the cross section thereof in all directions. From the guide pulleys, the bat passes between a pair of conveyor pulleys 182, the lower one of which is driven by a sprocket 184 in timed relation to the movements of the conveyor belt for the purpose of intermittently advancing the bat in accordance with the movement of the belt. The upper driving pulley maintains frictional engagement with the bat on the lower pulley by virtue of a spring mounting 184. Both the guide and driving pulleys are mounted upon an extension 186 of an upright frame 190. From the driving pulleys, the bat passes through an eye 192 and is thence guided loosely within the front portion 194 of the frame and delivered from the bottom about a guide pulley 196 to the appropriate conveyor belt. The method of guiding and driving individual bats as above described is repeated for the bats coiled in the under containers, each of these being provided with initial guide pulleys 176, cooperating pairs of guide pulleys 178 and 180, and driving pulleys 184. The bat, after passing through the eye 192, extends downwardly through an appropriate guiding surface formed in the front portion 194 of the frame, in position to be guided about the lower guide pulley 196 in register with one of the conveyor belts. All of the driving pulleys 184 are operated in timed relationship by a sprocket chain 200 which receives its motive power from a sprocket 202 mounted upon the same shaft with the sprocket 204 which drives the conveyor belt chain 206. At its upper end, the conveyor belt chain passes about a sprocket 208. The elongated driving chain for the three superimposed sets of driving pulleys is guided over pulleys 208 and 210 to maintain it taut and in engagement with the individual driven sprockets. Obviously the method of guiding and feeding the lengths of bat, as hereinbefore described, may be repeated for any number of similarly disposed containers with individual lengths of bat for the purpose of simultaneously feeding the desired number of bats at one and the same time.

The apparatus is driven in its entirety by an electric motor 215 which is connected to a drive shaft 217 through a drive chain 218 operating about drive pulleys 219 and 220, all as indicated in Figure 2. The main drive shaft 217 carries a worm gear 222 which meshes with a worm 224 loosely mounted upon a transverse shaft 226. The motor with connected worm gearing rotate continuously during the operation of the machine. The racks for operating the upper and lower sets of paddles are driven intermittently from the shaft 226 through tight and loose pulleys, as hereinbefore described. Mounted upon a stub shaft 230 are two sets of tight and loose pulleys indicated respectively at 231 and 233. Each set of tight and loose pulleys is adapted to be connected with an open belt 234 and a crossed belt 236, both belts passing at their lower portions about a wide pulley 238 mounted upon the shaft 226. The tight pulleys 231 and 233 connected to the shaft 230 drive the lower paddles through pinions 240 and 242 mounted respectively on the shaft 230 and the shaft 140, the racks being directly driven by similar gears 138 mounted on the same shaft as hereinbefore described.

The upper paddles are operated intermittently by the tight pulleys 250 and loose pulleys 252 driven respectively by the open and crossed belts 254 and 256, both of these belts being operated from a common driving pulley 258 mounted upon the opposite end of the shaft 226 with the pulley 238. The operation of the tight and loose pulleys through the crossed and open belts is accomplished simultaneously through four sliding belt shifters indicated respectively at 261, 262, 263 and 264. These sliding belt shifters engage respectively with the crossed and open belts for operating the upper and lower paddles and are operated in proper timed relation by belt shifting levers 265, 266, 267 and 268. The belt shifting levers are pivoted respectively at 270 and 272 and engage at their lower ends with the peripheral cams 274, 275, 276 and 277. These cams are mounted upon a common shaft 279 and are operated by a worm gear 280 fixed to the shaft and driven from a worm 282 fixed to the shaft 226, all as shown more particularly in Figures 2 and 3. Inasmuch as the cams are of conventional design intended to actuate the belt shifters at predetermined intervals in the operation of the cam shaft, it has not been thought necessary to show the cams in diagrammatic outline.

In operation, the cam shaft 279 and associated parts are caused to make one complete revolution after starting the machine and are thereafter automatically stopped. To this end the control handle 52, which operates the distending shoes and needle bar, is provided with a stud 300 which rides in an arcuate slot 302 formed in a rocking segment 304 which is pinned to the shaft 306. This control shaft 306, as indicated in Figs. 2 and 3, is provided at its opposite end with an arm 308 connected through a link 309 with a bell-crank 310, which controls a movable clutch member 312. When the control handle 52 is depressed, the first operation is to elevate the distending shoes and needle bar. Thereafter, if depression of the handle is continued through contact with the stud 300 with the lower end of the slot 302, the segment is rocked and through the chain of connected mechanism, the movable clutch member 312 is caused to engage with the cooperating clutch member 314 to clutch the continuously operating worm gear 224 with the shaft 226.

In order to insure automatic stopping of the cam shaft after one revolution and at a predetermined point, the shaft is provided with a disk 320 which carries a pin 322 adapted to engage with the end of a sliding rod 324 when in the position shown in Figure 3. The rod is mounted for sliding movement and at its opposite end, as shown in Figure 17, is connected with a bell-crank 326 which operates through a link 328 and arm 329 connected to the control shaft. The rocking of this arm and shaft operate to automatically disengage the clutch member 312. The sliding rod 324, as indicated more particularly in Figure 3, is provided with an attached bracket 327 which has a pin 331 riding in a slot 333 formed in a rocker member 330. The upper face of the rod is guided by a pin 332 and is normally held thereagainst by a strong spring 334. On stopping the machine the rod is caused to assume approximately the position shown in Figure 2, and before the apparatus can be restarted and the clutch properly engaged, it is necessary to remove the end of the rod from the path of the stud 322. This is accomplished from a centralized control through provision of a rocker arm 340 loosely mounted upon the shaft and provided with a driving tooth 342 adapted to be engaged by a pawl 344 provided upon the control handle 52 and designed to engage the ratchet tooth prior to engagement of the stud 300 with the lower end of the slot. Upon engagement of the pawl and ratchet and consequent rocking of the member 340, the link 350 is elevated and operates a second link 352 through a bell-crank 354. This link through second bell-crank 356 and link 358, as shown in Figure 3, oscillates the member 330 to depress the end of the rod 324 out of contact with the stud 322. As continued movement or depression of the control handle operates the shaft 306, the clutch is thereafter engaged and the mechanism started.

After completion of the starting movement the pawl 344 is caused to ride over a stationary shoe 370, as indicated in Figure 2, and to disconnect the pawl from the ratchet. This permits the rod 324 and connected parts to be restored to the position shown in Figure 3 by the spring 334 in position to be engaged by the stud 322 and to automatically release the clutch upon the completion of the cycle.

The conveyor belt 160 and associated feeding mechanisms, as stated previously, are operated in timed relation to the operation of the paddles. This is accomplished through provision of a gear 372 driven from a second gear 374 connected to the shaft of the gear 134. The gear 372 has pivoted upon the same shaft a ratchet 376 which drives a pawl 380 when rotating in one direction. This pawl is mounted upon an arm 382 connected directly to the sprocket 384, which in turn drives the conveyor belt sprocket 386 through a drive chain 390. With this construction the conveyor belt and feeding mechanism operated therefrom are moved to advance the bat during the forward or advancing movement of the upper paddle, the drive being connected with the drive for the upper paddles. During the rearward movement of the paddles the ratchet operates loosely beneath the pawl with no driving engagement. It follows from this that as the upper paddles advance carrying the length of bat therewith, the conveyor belt and mechanism for feeding the bat length to the belt will operate in exact timed relation to the advancing movements of the paddles and will cease feeding when movement of the paddles terminates.

During the insertion of the bats within the upholstery plaits the carriage 24 is locked in proximity to the main frame of the machine through inter-engagement of the locking members 400 and 402, mounted respectively on the carriage and pivoted on the frame. The locking member 402, as shown more particularly in Fig. 2, is in the form of a bell-crank which is automatically moved into operative position by a pin 404 on the needle rack when the latter is elevated.

At the completion of the operation the control handle is raised to depress the needle bar or needles into engagement with the individual bat lengths and distending shoes to clamp the bat lengths at the mouths of the pockets, as shown generally in Figure 6. This movement of the needle bar unlocks the clamps 400 and 402 and permits retraction of the carriage 24 through the crank 32. This retraction of the carriage severs the bat lengths at the mouths of the pockets as generally indicated in Figure 6.

In order to prevent substantial over running of the mechanisms upon the stopping of the drive shaft 226 and associated parts, the pulley 258 is surrounded with a brake strap 410 which is connected through a bell-crank 412 with an operating link 415 connected at its upper end with the arm 308 and adapted to grip the pulley through the rocking of the bell-crank upon movement of the arm to disconnect the clutch.

What is claimed is:

1. The process of filling plaited upholstery which consists in maintaining a formed plait in condition for the insertion of stuffing, introducing a paddle into the plait extending lengthwise thereof to provide a supporting and guiding surface for the introduction of the stuffing, introducing a second paddle with connected stuffing throughout the length of the plait, and thereafter withdrawing the first paddle and next the second paddle with the inserted stuffing retained in the plait through frictional engagement with the walls of the plait.

2. The process of filling plaited upholstery which consists in maintaining a formed plait with the mouth portion distended for the insertion of stuffing, introducing a paddle into the plait extending lengthwise thereof to provide a supporting and guiding surface for the introduction of the stuffing, introducing a second paddle with connected stuffing throughout the length of the plait, and thereafter withdrawing the first paddle and next the second paddle with the inserted stuffing retained in the plait through frictional engagement with the walls of the plait.

3. The process of filling plaited upholstery which consists in maintaining a formed plait in condition for the insertion of stuffing, introducing a paddle into the plait extending lengthwise thereof to provide a supporting and guiding surface for the introduction of the stuffing, introducing a second paddle with connected stuffing throughout the length of the plait, thereafter withdrawing the first paddle and next the second paddle with the inserted stuffing retained in the plait through frictional engagement with the walls of the plait, and severing the stuffing after withdrawal of the paddles by a lengthwise movement of the plait and inserted stuffing.

4. The process of filling plaited upholstery which consists in maintaining a formed plait in condition for the insertion of stuffing, introducing a paddle into the plait extending lengthwise thereof to provide a supporting and guiding surface for the introduction of the stuffing, introducing a second paddle with connected stuffing throughout the length of the plait, thereafter withdrawing the first paddle and next the second paddle with the inserted stuffing retained in the plait through frictional engagement with the walls of the plait, and severing the length of stuffing after withdrawal of the paddles by holding the stuffing without the plait and withdrawing the plait and inserted stuffing clamped therein in a lengthwise direction.

5. Apparatus for filling plaited upholstery comprising means for engaging and holding a formed plait, cooperating paddles for insertion within the plait, means for operating the paddles successively, means for connecting the length of bat to the second paddle upon an advancing movement to advance the bat over a support provided by the first paddle throughout the length of the plait, and means for guiding the length of bat into position to be engaged by one of the paddles upon advancing movement into the plait.

6. Apparatus for filling plaited upholstery comprising cooperating paddles adapted to engage opposite sides of the length of bat, means for advancing and retracting the paddles to first advance one supporting paddle into the plait and to next advance the other paddle, connections on said other paddle for securing a bat to be guided throughout the length of the plait by the first advanced paddle, means for holding the plait with the mouth distended in position to cause the paddles to enter thereinto upon an advancing movement, and means for severing the bat after withdrawal of the paddles.

7. Apparatus for filling plaited upholstery comprising oppositely disposed paddles, means for maintaining a plait in register with the paddles, connections on one of the paddles for engaging and gripping a length of bat during the advancing movement, and actuating means for the paddles constructed and arranged to first advance one of the paddles into the plait in advance of the bat and next advance the cooperating paddle with the bat engaged thereby, to thereafter withdraw the first introduced paddle and next the paddle with connected bat, leaving the inserted bat within the plait.

8. Apparatus for filling plaited upholstery comprising oppositely disposed paddles, means for maintaining a plait in register with the paddles, connections on one of the paddles for engaging and gripping a length of bat during the advancing movement, actuating means for the paddles constructed and arranged to first advance one of the paddles into the plait without the bat and next advance the cooperating paddle with the bat engaged thereby, to thereafter withdraw the first introduced paddle and next the bat introducing paddle, leaving the inserted bat within the plait, and means for holding the length of bat at approximately the point of introduction into the plait, and means for withdrawing the plait and inserted bat in a lengthwise direction to sever the length of bat.

9. Apparatus for filling plaited upholstery comprising a container for a length of bat, cooperating paddles, means for feeding and guiding the length of bat intermittently from the container to a position between the paddles, means for holding a formed plait in condition for the insertion of the bat, and means for advancing and retracting the paddles intermittently and in timed relation to the feed of the bat length to first introduce the supporting paddle into the plait and to next introduce a paddle with connected bat guided throughout the length of the plait by the supporting paddle.

10. Apparatus for filling plaited upholstery comprising upper bat introducing and lower bat supporting paddles, means for reciprocating the paddles in timed relation, feeding mechanism for advancing bat lengths to the paddles, and a one direction drive for the feeding mechanism operated in timed relation to the advancing movement of the upper bat introducing paddle to move a series of bats only during the introducing movement of one of the paddles.

11. Apparatus for filling plaited upholstery comprising upper bat introducing and lower bat supporting paddles, means for reciprocating the paddles successively and in timed relation, means for feeding a bat length to the paddles, drive mechanism for operating the feed and paddle mechanism in timed relation to advance a series of bats only during the introducing movement of one of the paddles, and a control for automatically disconnecting the mechanisms at the completion of a predetermined cycle of operation.

12. Apparatus for filling plaited upholstery comprising movable distending shoes adapted to be received within the mouths of upholstery compartments, means for moving the shoes to distend the compartments, and shoulders formed upon the shoes and about which the mouths of the compartments are drawn to lock the upholstery against withdrawal from the shoes when the upholstery is distended thereby.

HARRY J. COYNE.
FRANCIS J. COYNE.